United States Patent [19]
Sander et al.

[11] Patent Number: 5,588,562
[45] Date of Patent: Dec. 31, 1996

[54] TAMPER EVIDENT RESEALABLE PLASTIC CLOSURE

[76] Inventors: Dieter Sander, Mississauga; Uwe F. Meyer, Islington, both of Canada

[21] Appl. No.: 332,140

[22] Filed: Oct. 31, 1994

[51] Int. Cl.[6] .................................................. B67D 5/33
[52] U.S. Cl. .................. 222/153.06; 215/252; 215/311; 222/525; 222/541.6
[58] Field of Search ................. 222/153.06, 521, 222/524, 525, 541.6; 215/252, 253, 311

[56] References Cited

U.S. PATENT DOCUMENTS

| | | | |
|---|---|---|---|
| 3,504,818 | 4/1970 | Crisci et al. | 215/42 |
| 3,682,345 | 8/1972 | Baugh | 215/43 R |
| 3,902,621 | 9/1975 | Hidding | 215/252 |
| 3,902,921 | 9/1975 | Augustynski et al. | 136/102 |
| 3,963,139 | 6/1976 | Gach | 215/216 |
| 3,980,195 | 9/1976 | Fillmore | 215/256 |
| 4,034,882 | 7/1977 | Wright | 215/217 |
| 4,053,077 | 10/1977 | DeFelice | 215/217 |
| 4,084,716 | 4/1978 | Bogert | 215/217 |
| 4,469,253 | 9/1984 | Beard | 222/153 |
| 4,500,016 | 2/1985 | Funfstuck | 222/153 |
| 4,561,553 | 12/1985 | Crisci | 215/256 |
| 4,589,561 | 5/1986 | Crisci | 215/256 |
| 4,801,032 | 1/1989 | Crisci | 215/256 |
| 4,948,003 | 8/1990 | Munoz | 215/237 |
| 5,104,008 | 4/1992 | Crisci | 222/153 |
| 5,135,123 | 8/1992 | Nairn et al. | 215/252 |
| 5,257,724 | 11/1993 | Steijns | 222/153.06 |
| 5,356,019 | 10/1994 | Kelly | 215/252 |
| 5,429,282 | 7/1995 | Stebick | 222/525 X |

*Primary Examiner*—Joseph Kaufman
*Attorney, Agent, or Firm*—Harpman & Harpman

[57] ABSTRACT

A dual tamper indicating closure with resealable pour spout for use on plastic bottles and the like. The closure has a first annular indicator band engageable on a portion of a bottle neck secured to the closure by a plurality of frangible elements thereabout. A second annular indicator band is engageable on a secondary top on the pour spout. The secondary cap has a opening within that selectively registers with a plug positioned above an aperture in the closure from which the pour spout extends. Movement of the secondary cap on the pour spout separates the annular indicator band from the secondary top allowing access to the pour spout.

12 Claims, 2 Drawing Sheets

TAMPER EVIDENT RESEALABLE PLASTIC CLOSURE

BACKGROUND OF THE INVENTION

1. Technical Field

This device relates to tamper indicating closures for containers and the like requiring a push pull resealable tamper evident spout.

2. Description of Prior Art

Prior art closures of this type may be seen in U.S. Pat. Nos. 5,104,008, 5,105,967, 4,940,003, 4,801,032, 4,589,561, 4,561,553, 4,500,016, 4,469,253, 3,902,621 4,084,716, 4,053,007, 4,034,882, 3,980,195, 3,963,139, 3,902,921, 3,682,345, and 3,504,818.

SUMMARY OF THE INVENTION

A dual tamper evident resealable closure for bottles that require a dual tamper evident configuration defining a first tamper evident band on the closure adjacent the neck portion of the bottle to indicate registering tampering of the enclosure of the closure and a second tamper evident configuration on a push pull resealable pour spout having an opening therein which is partially closed by a second top having a secondary opening therein and a plug space thereabove by upwardly angled legs formed integral with the closure.

DESCRIPTION OF THE PREFERRED EMBODIMENT

Figure 1:
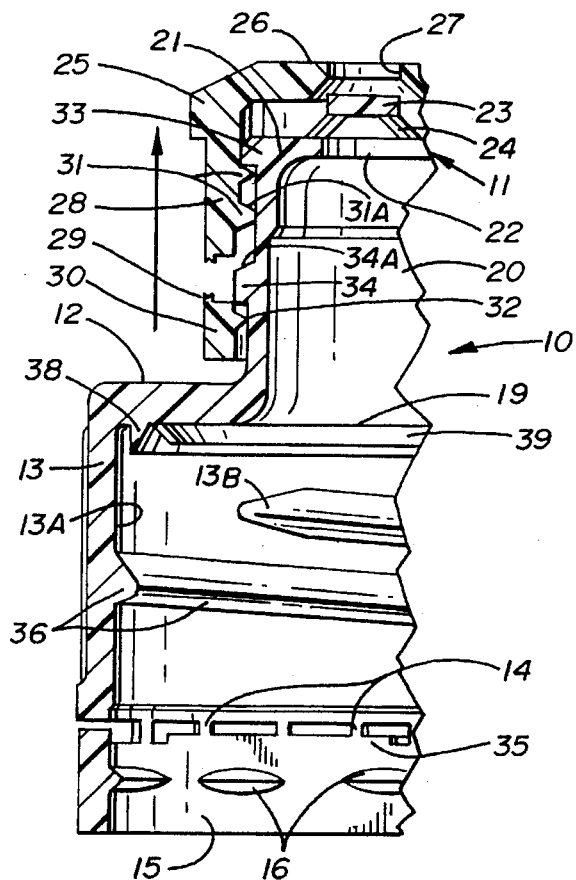
FIG. 1 is a vertical cross-section through a portion of the resealable bottle cap with the push pull pour spout in an opened position.
Figure 2:
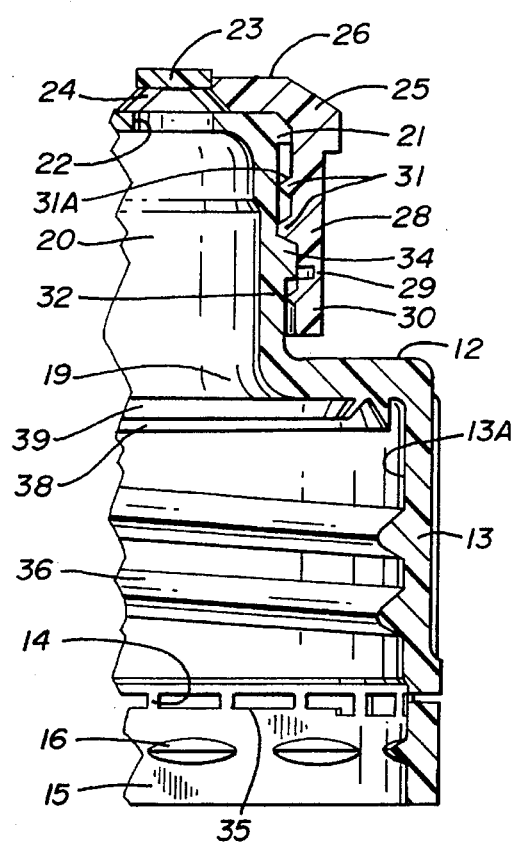
FIG. 2 is a vertical cross-section through a portion of the resealable bottle cap with the push pull top in a closed position.
Figure 3:
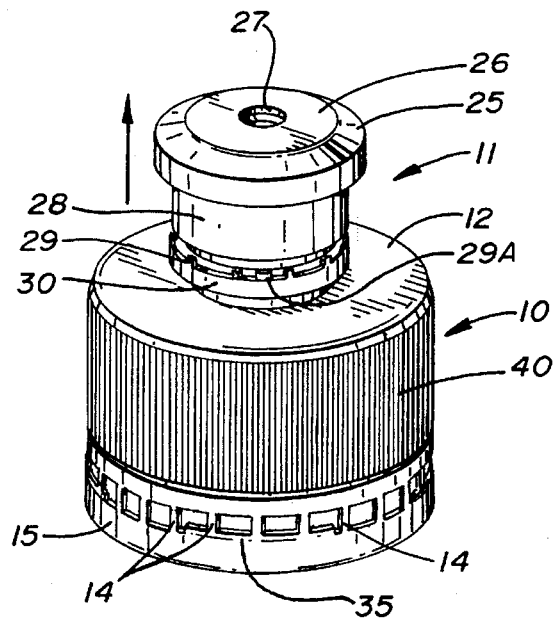
FIG. 3 is a perspective view of the resealable bottle cap.
Figure 4:
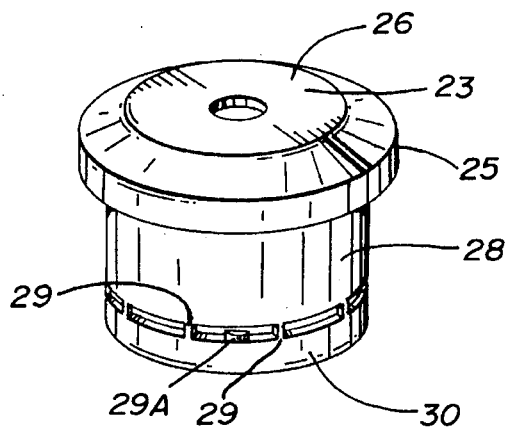
FIG. 4 is a perspective view of a portion of the resealable bottle cap.
Figure 5:
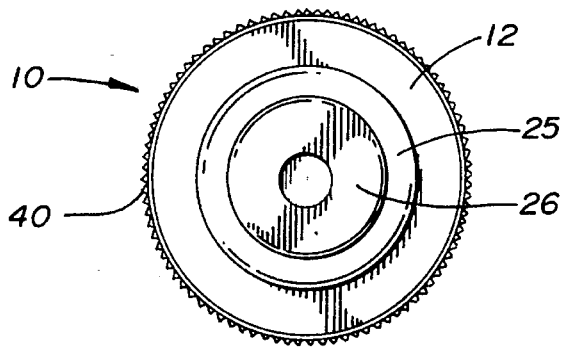
FIG. 5 is a top plan view of the resealable bottle cap.

Referring to FIGS. 1, 2 and 3 of the drawings, a resealable bottle cap 10 can be seen having a push pull secondary closure 11 thereon and comprising a top portion 12 with an integral depending annular flange 13 extending therefrom. A plurality of circumferentially spaced frangible elements 14 extend from the lower edge of the depending flange 13 to a tamper evident ring 15 integrally molded with the closure. The annular ring 15 is of the same diameter as that of the annular flange 13 of the closure and has a plurality of circumferentially spaced inwardly facing arcuate projections 16 thereon.

Figure 7:
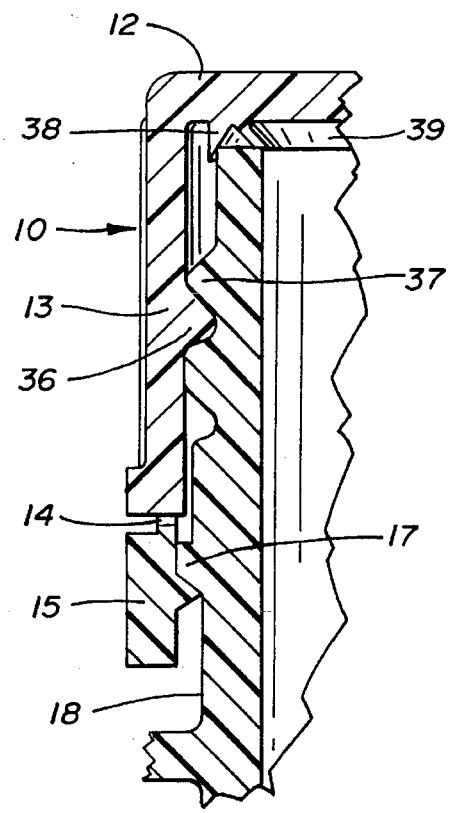
FIG. 7 is a partial enlarged cross-sectional view of a portion of the resealable bottle cap showing the bottle neck configuration.

Referring to FIGS. 1 and 7 of the drawings, it will be seen that the arcuate projections 16 are circumferentially spaced about the inner surface of said tamper evident ring 15 and are positioned so that they are engageable under an annular locking flange 17 on a bottle neck 18 as best seen in FIG. 7 of the drawings.

Referring now to FIG. 1 of the drawings, it will be seen that an opening 19 is formed in the center of the top portion 12 of the cap 12 with an upstanding cylindrical pour spout 20 positioned in registry with the opening 19. The upper end of the pour spout 20 having a secondary top portion 21 thereon which is apertured at 22. A plug 23 is positioned on the secondary top portion 21 in spaced relation to the aperture 22 by a plurality of circumferentially spaced angularly arranged upwardly extending legs 24. A push pull top cap 25 is positioned on the upstanding cylindrical pour spout 20 having a bottom portion 26 with a central opening 27 therein which registers with the plug 23 to form a secondary closure when the top cap 25 is in closed position as illustrated in FIG. 2 and resting on the secondary top portion 21 of the upstanding cylindrical pour spout 20. It will be seen that the top cap 25 has a depending cylindrical body member 28 with a plurality of annularly spaced frangible elements 29 connected on its lower perimeter edge to a secondary tamper indicating band 30. A plurality of upstanding stops 29A are positioned in spaced circumferential arrangement about the tamper evident band 30 between the frangible elements 29. The cylindrical body member 28 has a pair of vertically spaced inturned annular flanges 31 having tapered upper and lower surfaces 31A which slideably engage the outer surface of the upstanding cylindrical pour spout 20. The secondary tamper evident band 30 also has a tapered internal annular flange 32 which is slideably engaged at the exterior of the upstanding cylindrical pour spout 20. The upstanding cylindrical pour spout 20 has two outwardly extending annular flanges 33 and 34 respectively on the exterior thereof the flange 34 having a tapered top portion 34A. The flanges 31 being oppositely disposed with respect to the secondary top portion 21. The outwardly extending flange 34 positioned therebelow, above the top 12 of the cap 10 and being oppositely disposed and between the annular flanges 31 and 32 on the cylindrical body member 28 and secondary tamper evident band 30 respectively.

In assembled form as illustrated in FIGS. 1, 2, 3 and 6 of the drawings, the secondary tamper evident band 30 joined by the frangible elements 29 to the cylindrical body member 28 of the top cap 25 is incapable of moving upwardly due to the interengagement of the inturned flange 32 thereon with the outwardly extending flange 34 on the cylindrical pour spout 20 and thus the cylindrical body member 28 of the top cap 25 is encapable of vertical movement such as required to move the apertured top 26 thereabove the plug 23 until sufficient force is applied to the top cap 25 to break away the frangible elements 29 whereby the top cap 25 can move to the position illustrated in FIG. 1 of the drawings wherein the opening 27 therein moves upwardly and away from the plug 23. The inturned annular flanges 31 on the cylindrical body member 28 cannot move above the outwardly extending annular flange 33 on the upstanding cylindrical pour spout 20 so that the top cap 25 cannot be removed therefrom. The upstanding stops 29A prevent compression and premature breakage of the frangible elements 29 prior to intended use.

Referring to FIGS. 1, 2, 3 and 6 of the drawings, the tamper evident band 15 has a plurality of circumferentially spaced elevated areas 35 each of said elevated areas 35 positioned between said respective frangible elements 14 hereinbefore described. The elevated areas 35 extend from the tamper evident band 15 in spaced relation to the lower edge of the depending annular flange 13 of the resealable bottle cap 10 and provide selective support of the tamper evident band 15 to resist vertical movement imparted by the deflection of the tamper evident band 15 during insertion on the bottle neck 18 protecting the frangible elements 14 during assembly.

The elevated areas 35 also serve to protect the frangible elements 14 during the molding process (not shown) in the same manner as is well known to those skilled in the art.

Referring back to FIGS. 1, 2, and 7 of the drawings, the depending annular flange 13 has a inwardly extending spiral thread 36 from its interior annular surface 13A extending about a portion of the interior annular surface 13A terminating adjacent the top perimeter edge of said annular depending skirt 13 at 13B. The spiral thread 36 is registerable with a spiral thread 37 extending outwardly from the exterior of the neck portion 18, best seen in FIG. 7 of the drawings. Referring back to FIGS. 1 and 2 of the drawings, the relative positioning of the spiral thread 36 and the projections 16 on the annular band 15 can be seen to be in a circumferentially spaced overlapping relationship imparting offsetting points of engagement with the respective registering counter parts of the locking annular flange 17 on the bottle neck 18.

A first annular depending sealing flange 38 extends downwardly from the closure top portion 12 in spaced relation to the depending annular skirt 13. A second sealing flange extends angularly inwardly from said top portion 12 adjacent said first sealing flange 38 defining a multiple sealing configuration against the neck portion 18 of the bottle during use.

Figure 6:
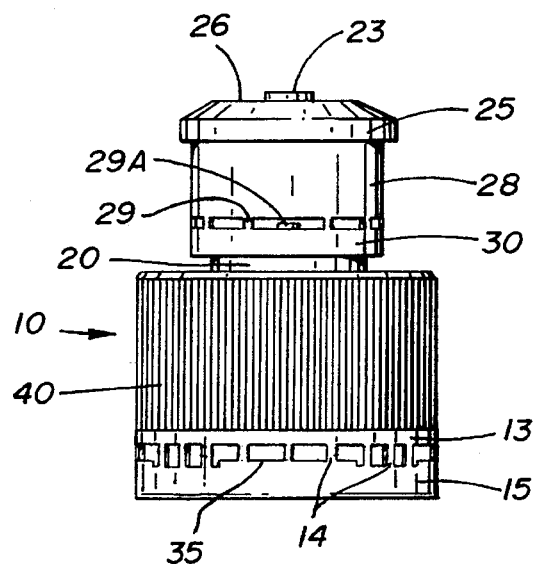
FIG. 6 is a side elevational view of the resealable bottle cap.

Referring to FIG. 6 of the drawings, the push pull closure 10 may be seen in assembled condition as hereinbefore described in FIGS. 1 and 2 illustrating an outside rib surface 40 on the depending annular flange 13.

To remove the push pull closure cap 10 from the bottle neck 18, a counter-clockwise rotation of the cap 10 is required which will accordingly engage the respective registering spiral threads 36 and 37 moving the push pull closure 10 upwardly, breaking the frangible elements 14 connecting the tamper evident ring 16 to the cap's depending. annular flange 13 leaving the tamper evident ring 16 on the neck portion 18 below the locking flange 17 as will be well understood by those skilled in the art.

Thus, it will be seen that an improvement in a resealable bottle cap of the invention with a push pull closure and threaded tamper evident flexible plastic closure has been illustrated and described and it will be apparent to those skilled in the art that various changes and modifications may be made thereto without departing from the spirit of the invention.

Therefore I claim:

1. An improvement in a resilient molded plastic resealable closure for a bottle having a neck surrounding an opening, said neck having a spiral thread extending outwardly of said neck; the improvement comprising in combination; a cap having a top portion, an annular depending flange on said top portion, a segmented spiral thread in said annular depending portion, a plurality of circumferentially spaced outwardly extending frangible elements on said depending flange, a thin flexible annular band on the outer ends of said frangible elements is spaced in relation thereto, said flexible annular band having a plurality of annularly circumferentially spaced elevated bridge portions thereon extending axially towards said depending flange, the elevated bridge portions defining areas of decreased ring spacing from said depending flange therebetween, said frangible elements extending from said elevated bridge portions and from said flexible annular band interconnecting with a bottom edge of said depending flange, a plurality of circumferentially spaced radially inwardly extending arcuate projections on said flexible annular band registerable with an annular locking flange on said bottle's neck on which the closure is positioned, an internal pour spout on said top portion communicating with an opening in said top, said pour spout having an apertured secondary top thereon, and means for positioning a plug in spaced relation to said secondary top portion and said aperture, a top cap movably positioned on said pouring spout and having an opening registerable with said plug defining a closure when said top cap is in a first position, a band having a plurality of frangible elements integrally connected with said band with said top cap in said first position, a plurality of upstanding stops on said band between said frangible elements, a flange on said pour spout retaining said band in said first position when said top cap is moved away from said first position to a second position locating said opening is said top cap in spaced relation to said plug, said flange on said pour spout having a tapered top portion, means for spacing said top cap in relation to said pour spout and means for retaining said top cap on said pour spout in said second position.

2. The improvement in a resilient molded plastic resealable bottle cap in combination of claim 1 wherein said means for positioning said plug in spaced relation to said secondary top cap and said aperture comprises, multiple circumferentially spaced legs extending upwardly from said secondary top portion.

3. The improvement in a resilient molded plastic resealable bottle cap in combination of claim 1 wherein said upstanding pour spout has a tubular body of a known outer diameter, and said top cap has a cylindrical body, the inner diameter of which is greater than said known outer diameter of said tubular body.

4. The improvement in a resilient molded plastic resealable bottle cap in combination of claim 1 wherein each of said arcuate projections on said tamper indicating ring are circumferentially aligned in vertical spaced relation to said elevated bridge portions on said tamper indicating ring.

5. The improvement in a resilient molded plastic resealable bottle cap in combination of claim 1 wherein segments of said spiral thread on said depending annular flange are in spaced vertical alignment with one another and in overlapping annular offset alignment with said arcuate projections on said tamper indicating ring.

6. The improvement in a resilient molded plastic resealable bottle cap in combination of claim 1 wherein said elevated bridge portions extending from said flexible annular band are of a known vertical height and said frangible elements extend from said flexible annular band are of a vertical height greater than that of said elevated bridge portion's known vertical height.

7. The improvement is a resilient molded plastic resealable bottle cap in combination of claim 1 wherein said means for spacing said top cap in relation to said pour spout comprises a pair of inturned annular flanges on said top cap in spaced relation to said band, said flanges having annularly disposed upper and lower surfaces thereon.

8. The improvement in a resilient molded plastic resealable bottle cap in combination of claim 1 wherein said means for retaining said top cap on said pour spout comprises an out-turned annular flange on said pour spout in spaced relation to said band retaining flange.

9. A combination of resilient molded plastic resealable bottle cap having a top portion, an annular depending flange on said top portion, a tamper evident thin flexible annular band on a plurality of circumferentially spaced radially outwardly extending frangible elements on said depending flange; and a resealable pour spout extending from said top portion, an opening in the top portion registerable with said pour spout, said pour spout having a secondary top portion, a closure plug in spaced relation from said secondary top portion, a top cap movably positioned on said pour spout having an opening registering with said plug defining a resealable closure when said top cap is in a first position, a tamper evident band having a plurality of frangible elements integrally connected with said band with said top cap in said first position, upstanding stops extending from said band in spaced relation to said top cap, an annular flange on said pour spout retaining said band in first position when said top cap is moved away from said first position, a plurality of circumferentially spaced elevated bridge portions extending from said tamper evident band of said top portion, said frangible elements extending from said respective elevated bridge portions and from said tamper evident band interconnecting with the bottom perimeter edge of said depending annular flange, said elevated bridge portions defining areas between having increased vertical spacing from said depending annular flange, a plurality of annularly spaced projections extending inwardly from said tamper indicating band and a spiral thread extending inwardly from said depending annular flange.

10. The combination of resealable resilient molded plastic bottle cap in claim 9 wherein said closure plug has a plurality of circumferentially spaced legs extending therefrom to said secondary top portion about said opening in said top, registerable with said opening in said top cap.

11. The combination of a resealable resilient plastic bottle cap in claim 9 wherein said upstanding pour spout has a tubular body of a known outer diameter, and said top cap has a cylindrical body, the inner diameter of which is greater than that of said outer diameter of said tubular body.

12. The combination of a resealable resilient plastic bottle cap in claim 9 wherein said spiral thread on said depending annular flange is engageable on a spiral thread on said container's neck.

* * * * *